R. E. BERGMANN.
WHEEL SECURING MEANS.
APPLICATION FILED MAY 18, 1909.
956,031.
Patented Apr. 26, 1910.
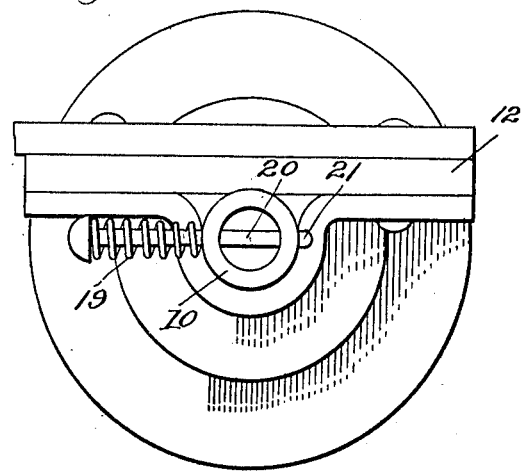
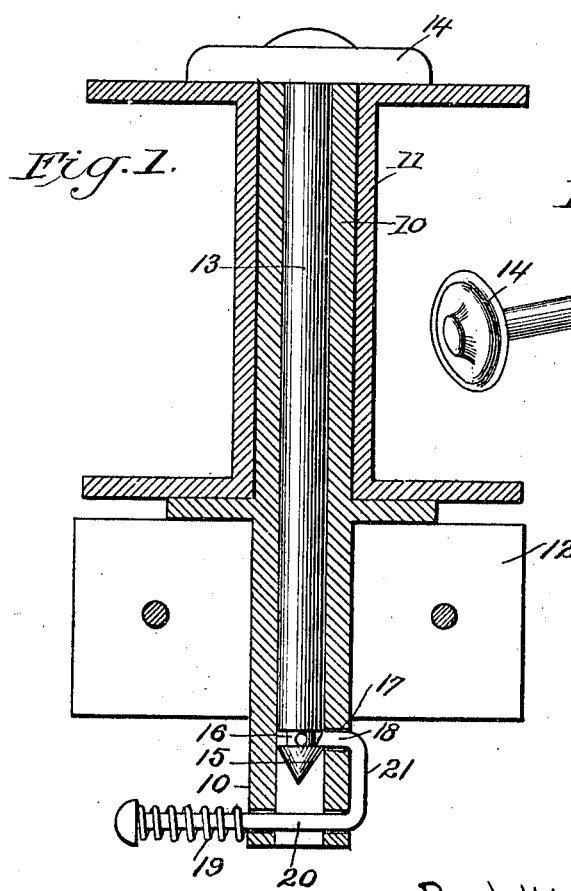
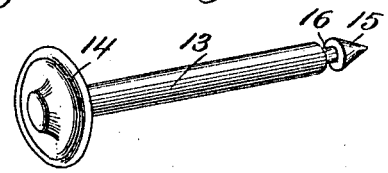
Inventor
Rudolph E. Bergmann,
By Mason Fenwick Lawrence,
Attorneys
Witnesses
H. Strauss
D. L. Richmond

UNITED STATES PATENT OFFICE.

RUDOLPH ERDMANN BERGMANN, OF SALT LAKE CITY, UTAH.

WHEEL-SECURING MEANS.

956,031.  Specification of Letters Patent.  Patented Apr. 26, 1910.

Application filed May 18, 1909. Serial No. 496,766.

*To all whom it may concern:*

Be it known that I, RUDOLPH ERDMANN BERGMANN, a citizen of the United States, residing at Salt Lake City, in the county of Salt Lake and State of Utah, have invented certain new and useful Improvements in Wheel-Securing Means; and I do hereby declare the following to be a full, clear, and exact description of the invention, such as will enable others skilled in the art to which it appertains to make and use the same.

This invention relates to wheel securing means and has for an object to provide improved means for securing a hub upon the axle.

While the present invention is adapted especially for use in connection with vehicles and vehicle wheels it will be obvious that it will be operative for and in association with wheels and for various purposes.

With these and other objects in view, the invention comprises certain novel constructions, combinations and arrangements of parts, as will be hereinafter fully described and claimed.

In the drawings:—Figure 1 is a longitudinal section view of the fastening means. Fig. 2 is a view of the fastening means in elevation. Fig. 3 is a perspective view of the securing spindle.

Like characters of reference designate corresponding parts throughout the several views.

As shown in the drawings an axle 10 is shown tubular or hollow providing a bearing for the hub 11. The hub 11 may be of any ordinary or approved construction and the axle 10 may be a short axle secured as at 12 to a frame-work of any kind or it may continue entirely across the vehicle as found expedient.

Whatever the construction of the axle the bearing stud upon which the hub rotates is of substantially equal length with the hub and a spindle 13 is inserted within the bore of the axle and is provided with a head 14 large enough to prevent displacement of the hub from the axle.

The spindle 13 is provided at its extremity with a pointed or conical end 15 with a groove 16 adjacent the base of the cone 15.

Extending within an opening 17 is a pin 18 held to seat by any approved resilient means applied in any approved manner here shown specifically as a spring 19 embracing a portion 20 integral with the pin 18 joined by means of the connecting member 21. The arrangement as shown is a convenient arrangement extending as it does through the axle and forms a bearing to prevent lateral play of the pin and to insure its return properly to seat when released.

It will be obvious that with the parts associated as shown in the drawings the hub 11 cannot be displaced from the axle as the head 14 prevents such displacement and by reason of the engagement of the pin 18 with the groove 16 the spindle 13 carrying the head 14 is prevented from becoming displaced. When, however, it is desirable to remove the hub the spring 19 is compressed by moving the pin 20 thereby lifting the pin 18 from the groove 16 whereupon the spindle 13 may be withdrawn from the axle of course withdrawing the head therewith after which the hub may be removed from the axle without difficulty. In returning the parts to place the hub is first placed in position upon the axle whereupon the spindle 13 is entered in the bore of the axle and pushed to seat, the conical extremity causing the pin 18 to ride up the incline and to snap automatically into the groove 16 whereby such spindle is held in position. As it is desirable that the disk 14 remain stationary a hole is provided in the spindle 13 within the groove 16 into which the pin 18 is inserted by the action of the spring when the spindle is rotated, and which maintains such spindle and disk against rotation.

What I claim is:—

1. In a wheel securing device, a hollow axle, a spindle insertible within the hollow axle, means carried by the spindle for positioning a hub, a latch carried by the axle and resilient means for holding the latch in engagement with the spindle.

2. In a wheel securing device, a hollow axle, a spindle insertible within the axle, and provided at one end with a head and at the opposite end with a recess, and a spring-pressed detent carried by the axle adapted to engage the recess.

3. In a wheel securing device, a hollow axle, a spindle insertible within the hollow axle and provided with a head larger in diameter than the diameter of the axle, and with a recess at the end opposite the head, and a resiliently depressed detent carried by the axle adapted to engage within the recess.

4. In a wheel securing device, a hollow axle, a spindle insertible within the axle and provided with a head at one end greater in diameter than the diameter of the axle, and with its end opposite the head formed with an incline, and a depression, and a detent carried by the axle adapted to ride up the incline and engage within the recess.

5. In a wheel securing device, a hollow axle, a spindle insertible within the hollow axle and provided at one end with a head greater in diameter than the diameter of the axle, and at its opposite end provided with a conical extremity and a groove adjacent the extremity and a spring-pressed detent carried by the axle adapted to ride upon the conical extremity and snap automatically within the groove.

6. In a wheel securing device, a hollow axle, a spindle insertible within the axle, means carried by the spindle adapted to position a hub, a bar extending through the axle, a detent carried by the bar and adapted to engage the spindle, and resilient means for positioning the bar and detent.

7. In a wheel securing device, a hollow axle, a spindle insertible within the axle and provided at one end with a head greater in diameter than the diameter of the axle and at its opposite end with an inclined extremity and a recess, a U-shaped rod extending through the axle and having one end formed into a detent adapted to engage the recess, and a resilient member carried by the opposite end adapted to hold the detent yieldingly to seat.

In testimony whereof I affix my signature in presence of two witnesses.

RUDOLPH ERDMANN BERGMANN.

Witnesses:
STEPHEN L. RICHARDS,
MAE SOULE.